US010676180B2

(12) United States Patent
Marcel

(10) Patent No.: US 10,676,180 B2
(45) Date of Patent: *Jun. 9, 2020

(54) MULTI-ROTOR PERSONAL AIR VEHICLE WITH A CENTRAL LIFTING FAN

(71) Applicant: Airborne Motors, LLC, The Woodlands, TX (US)

(72) Inventor: Jesse Antoine Marcel, Veradale, WA (US)

(73) Assignee: Airborne Motors, LLC, The Woodlands, TX (US)

(*) Notice: Subject to any disclaimer, the term of this patent is extended or adjusted under 35 U.S.C. 154(b) by 144 days.

This patent is subject to a terminal disclaimer.

(21) Appl. No.: 15/891,293

(22) Filed: Feb. 7, 2018

(65) Prior Publication Data

US 2018/0178906 A1 Jun. 28, 2018

Related U.S. Application Data

(63) Continuation of application No. 14/987,198, filed on Jan. 4, 2016, now Pat. No. 10,040,544.

(Continued)

(51) Int. Cl.
*B64C 27/08* (2006.01)
*B64C 27/20* (2006.01)
(Continued)

(52) U.S. Cl.
CPC .............. *B64C 27/08* (2013.01); *B64C 27/20* (2013.01); *B64D 27/24* (2013.01); *G05D 1/102* (2013.01); *Y02T 50/62* (2013.01)

(58) Field of Classification Search
CPC ......... B64C 27/08; B64C 27/20; B64D 27/24; G05D 1/102

(Continued)

(56) References Cited

U.S. PATENT DOCUMENTS 3,265,329 A   8/1966 Postelson
3,396,391 A   8/1968 Anderson
(Continued)

FOREIGN PATENT DOCUMENTS

JP    3029792    2/2000
RU    2538737    8/2014

OTHER PUBLICATIONS

International Search Report and Written Opinion of the International Searching Authority completed Aug. 28, 2016, in International Patent Application No. PCT/US16/12073, 12 pages.

(Continued)

*Primary Examiner* — Thomas G Black
*Assistant Examiner* — Luat T Huynh
(74) *Attorney, Agent, or Firm* — Lowe Graham Jones PLLC

(57) ABSTRACT

A flying vehicle with a fuselage having a longitudinal axis, a cockpit extending substantially from the center of the fuselage, a left front wing extending from the fuselage, a right front wing extending from the fuselage, a left rear wing extending from the fuselage, a right rear wing extending from the fuselage. Each wing contains a rotor rotatably mounted and a direct drive brushless motor providing directional control of the vehicle. A centrally located ducted fan encompasses the cockpit and provides VTOL capabilities. The central location of the cockpit and central ducted fan aid in balance and stability. The central ducted fan is itself a brushless motor with the stator windings encapsulated in the ducted fan housing and rotor magnets within the fan. All motors and rotatable mounts are controlled by a fly-by-wire system integrated into a central computer with avionics allowing for autonomous flight.

23 Claims, 9 Drawing Sheets

Related U.S. Application Data

(60) Provisional application No. 62/099,212, filed on Jan. 2, 2015.

(51) Int. Cl.
    *G05D 1/10*     (2006.01)
    *B64D 27/24*     (2006.01)

(58) Field of Classification Search
    USPC .................................................. 701/7
    See application file for complete search history.

(56) References Cited

U.S. PATENT DOCUMENTS

| | | |
|---|---|---|
| 3,991,487 A | 11/1976 | Bede |
| 5,454,531 A | 10/1995 | Melkuti |
| 6,270,038 B1* | 8/2001 | Cycon ............... B64C 27/20 244/12.2 |
| 6,431,494 B1 | 8/2002 | Kinkead et al. |
| 6,919,663 B2 | 7/2005 | Iles-Klumpner |
| 7,032,861 B2 | 4/2006 | Sanders, Jr. et al. |
| 7,152,301 B2 | 12/2006 | Rittmeyer |
| 7,874,513 B1* | 1/2011 | Smith ............... B64C 11/001 244/12.4 |
| 8,083,557 B2 | 12/2011 | Sullivan |
| 8,761,961 B2* | 6/2014 | Lee ............... G05D 1/0016 244/175 |
| 2003/0085319 A1* | 5/2003 | Wagner ............... B64C 3/56 244/12.3 |
| 2011/0178711 A1 | 7/2011 | Christoph |
| 2012/0056040 A1 | 3/2012 | Brotherton-Ratcliffe et al. |
| 2013/0020429 A1 | 1/2013 | Kroo |
| 2015/0149000 A1* | 5/2015 | Rischmuller ......... B64C 39/024 701/7 |
| 2016/0207625 A1* | 7/2016 | Judas ............... B64C 29/0025 |
| 2017/0073065 A1* | 3/2017 | Von Novak ......... B64C 39/024 |

OTHER PUBLICATIONS

International Search Report and Written Opinion of the International Searching Authority completed Jul. 12, 2019, in International Patent Application No. PCT/USI9/024696, 6 pages.

\* cited by examiner

MULTI-ROTOR PERSONAL AIR VEHICLE WITH A CENTRAL LIFTING FAN

PRIORITY CLAIM

This application is a continuation of U.S. patent application Ser. No. 14/987,198, filed on Jan. 4, 2016; which claims the benefit of priority from U.S. Provisional Patent Application No. 62/099,212, filed on Jan. 2, 2015, which applications are incorporated herein by reference in their entireties.

FIELD OF THE INVENTION

This invention relates generally to the field of vertical take-off and landing (VTOL) aircraft. More specifically, to compact VTOL aircraft that can be utilized as a personal air vehicle (PAV).

SUMMARY OF THE INVENTION

The present invention comprises a personal air vehicle (PAV). The vehicle employs wing mounted tilting rotors that provide directional control as well as counter rotational torque of the vehicle and a large centralized ducted fan that encompasses the cockpit providing vertical takeoff and landing capabilities. The tilting rotors are preferably driven directly by out-runner style brushless electric motors. The centralized ducted fan assembly is itself an in-runner style brushless motor that integrates the stator windings in its ducted fan housing and magnets in a shroud fastened or molded to the rotor's fan blades. The centralized ducted fan allows for a compact vehicle that is centrally balanced with a low center of gravity. The cockpit is centered in the hub of the main fan such that changing passenger weight and payload will not affect the center gravity for the vehicle. The weight of the magnets in the integrated rotor's shroud are preferably positioned to create a heightened gyroscopic effect in the spinning rotor, adding stability to the PAV. The motors are powered by either fuel cell or electric batteries.

The present invention integrates a central computer utilizing a fly-by-wires system that controls the motors powering the rotors and servomechanisms that actuate the rotatable motor mounts. The computer, including avionics, allows for autonomous control of the vehicle whereby the driver can input commands through a steering wheel, floor pedals or other control apparatus to create a flight path.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Embodiments described herein illustrate a multi-rotor electric personal air vehicle (PAV) 120 with a central-ducted rotor according to the present invention. More specifically, FIGS. 1-4 illustrate an example embodiment of the PAV in an assembled state. The PVA 120 allows a user to take off vertically and fly to the user's destination at a useful altitude from about two feet to about 20,000 feet, depending on the PAV configuration. Because of the vehicles compact design due to its centralized rotor assembly, the vehicle can be parked inside an average two car garage or other suitable space.

Figure 5:
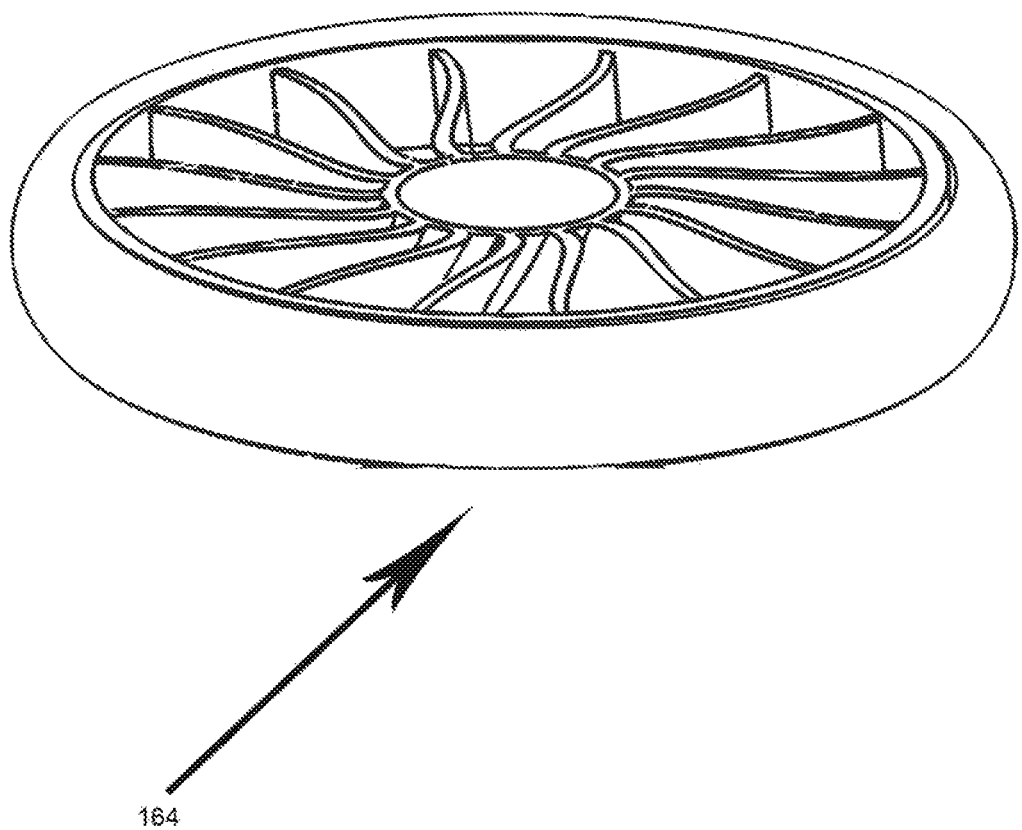
FIG. 5 is a perspective view of the central ducted fan assembly.
Figure 6:
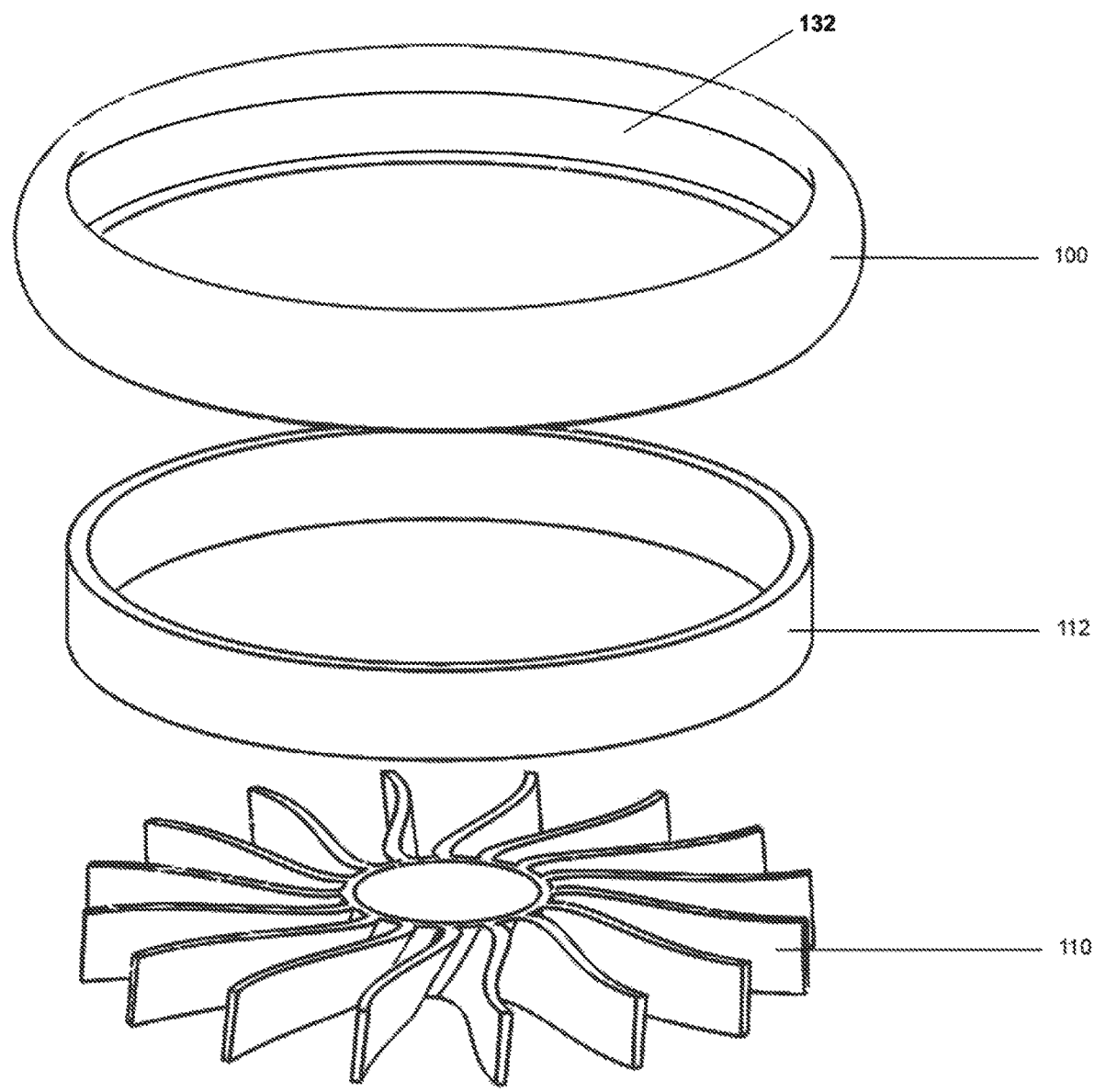
FIG. 6 is an exploded view of the preferred embodiment of the central cockpit encompassing ducted fan.
Figure 7:
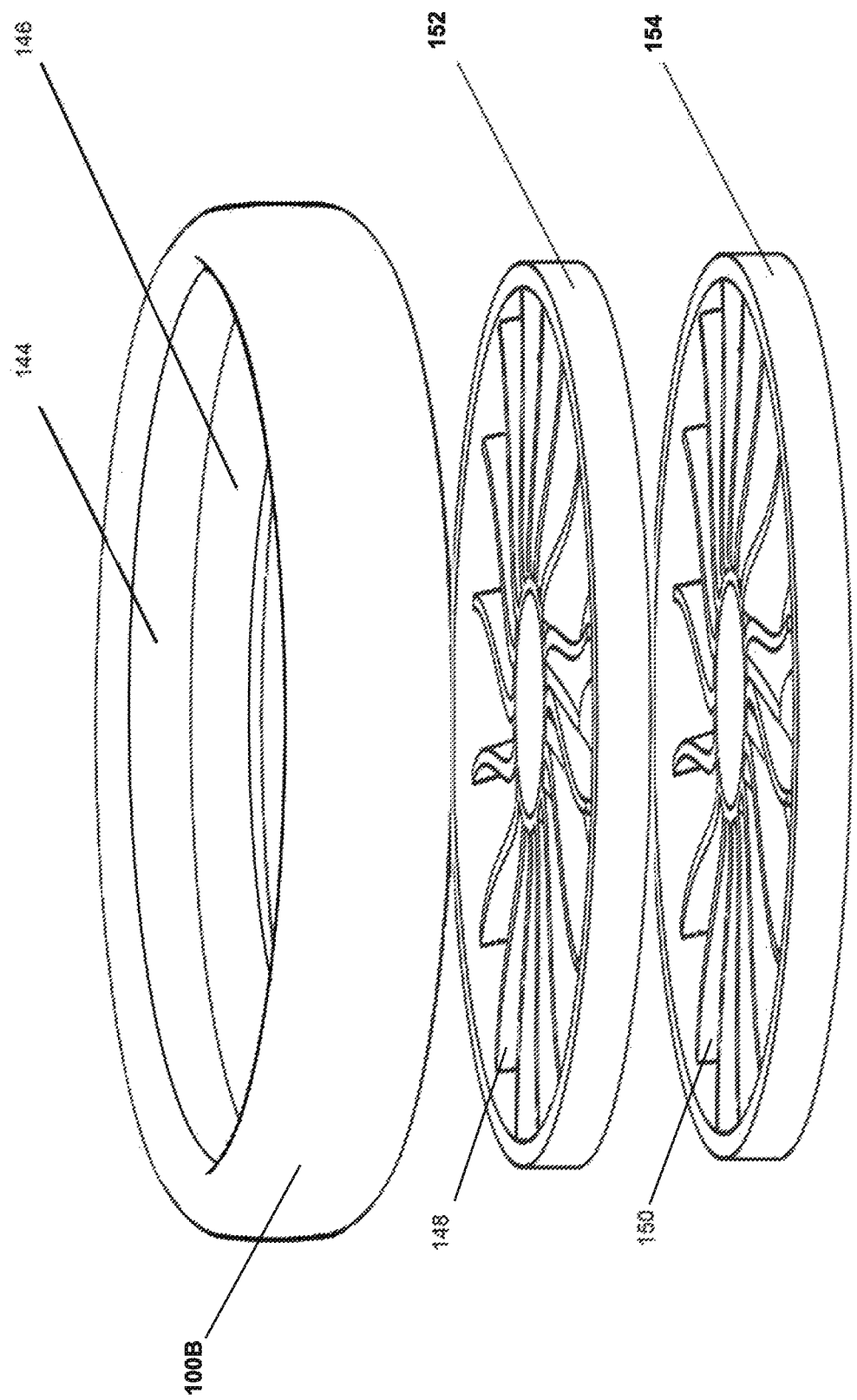
FIG. 7 is an alternate embodiment of an exploded view of a counter rotating rotor(s) central ducted fan embodiment.

With reference to FIGS. 1-4, the PAV 120 preferably utilizes a central rotor assembly 164 and four peripheral rotor assemblies 166 connected to a fuselage 102. An alternative number of peripheral rotor assemblies may be used, depending on the fuselage configuration and intended usage of the PAV. For example, the PAV 120 may be operated with a single continuous wing, or with two wings mounted each fore or aft of the central rotor assembly 164. The central rotor assembly 164, shown further with reference to FIGS. 5 and 6, provides primary vertical takeoff and landing abilities. The assembly includes a central rotor 110 and a central rotor shroud 112 partially enclosed by a ducted fan housing 100. In the preferred embodiment, the ducted fan housing 100 may be made of a lightweight composite material, aluminum or other suitable materials, and the central rotor and central rotor shroud are formed from a single construction. In an alternate embodiment shown in FIG. 7, the central rotor assembly 164 includes two counter rotating rotors, upper 148 and lower 150, each with opposite pitch, and each with integrated magnetic shrouds, upper 152 and lower 154, respectively. These are located within an alternative ducted fan housing 100b, which further includes two stator windings 144,146 that force the two rotor shrouds 152, 154 to rotate in opposite directions. The counter rotating rotors eliminate rotational torque of the central rotor assembly. In operation, the integrated magnetic rotor shrouds become a gyroscope due to the inherent weight of the magnetic elements.

Figure 8:
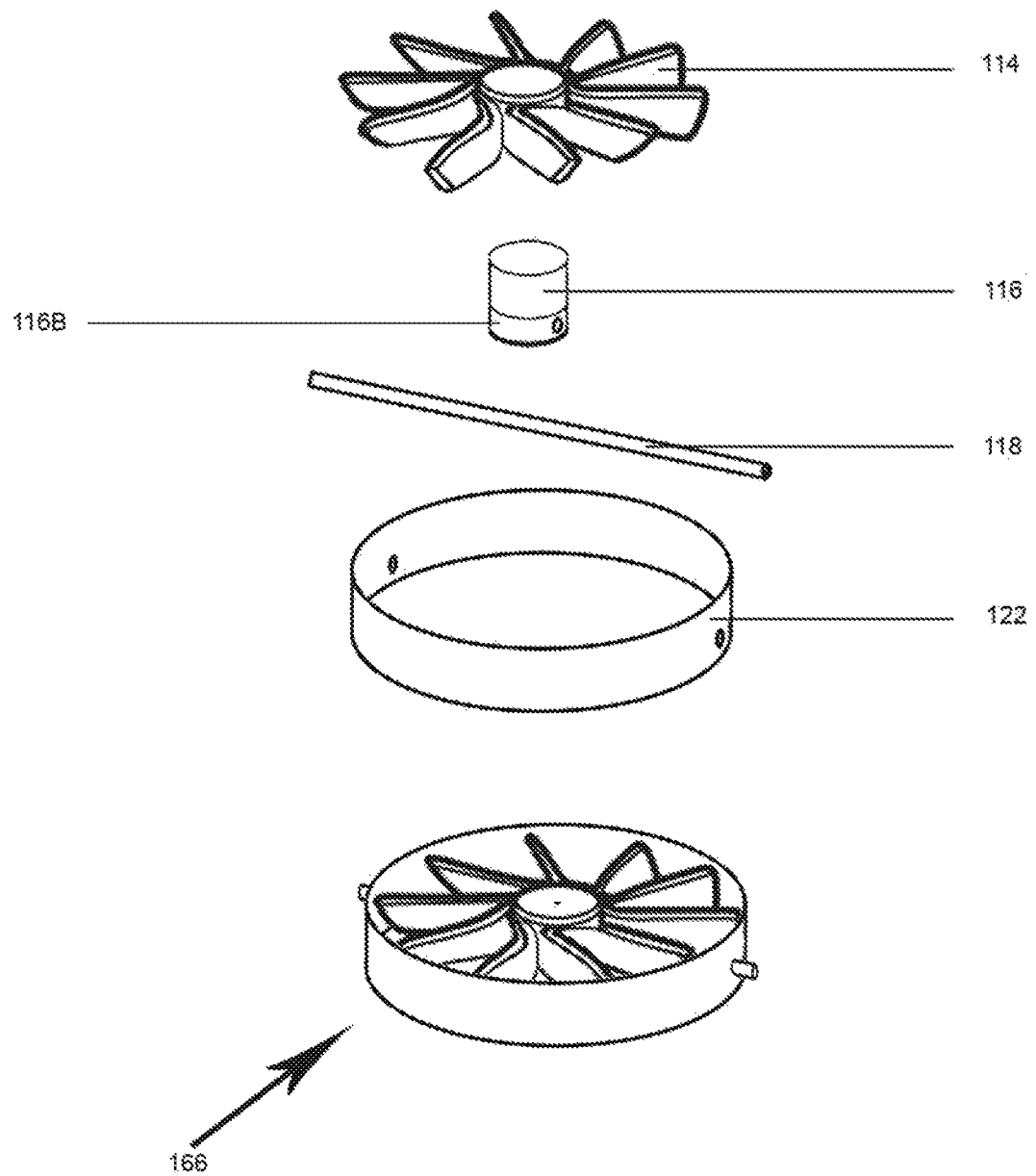
FIG. 8 is an exploded view of the preferred embodiment of the peripheral rotor means.
Figure 9:
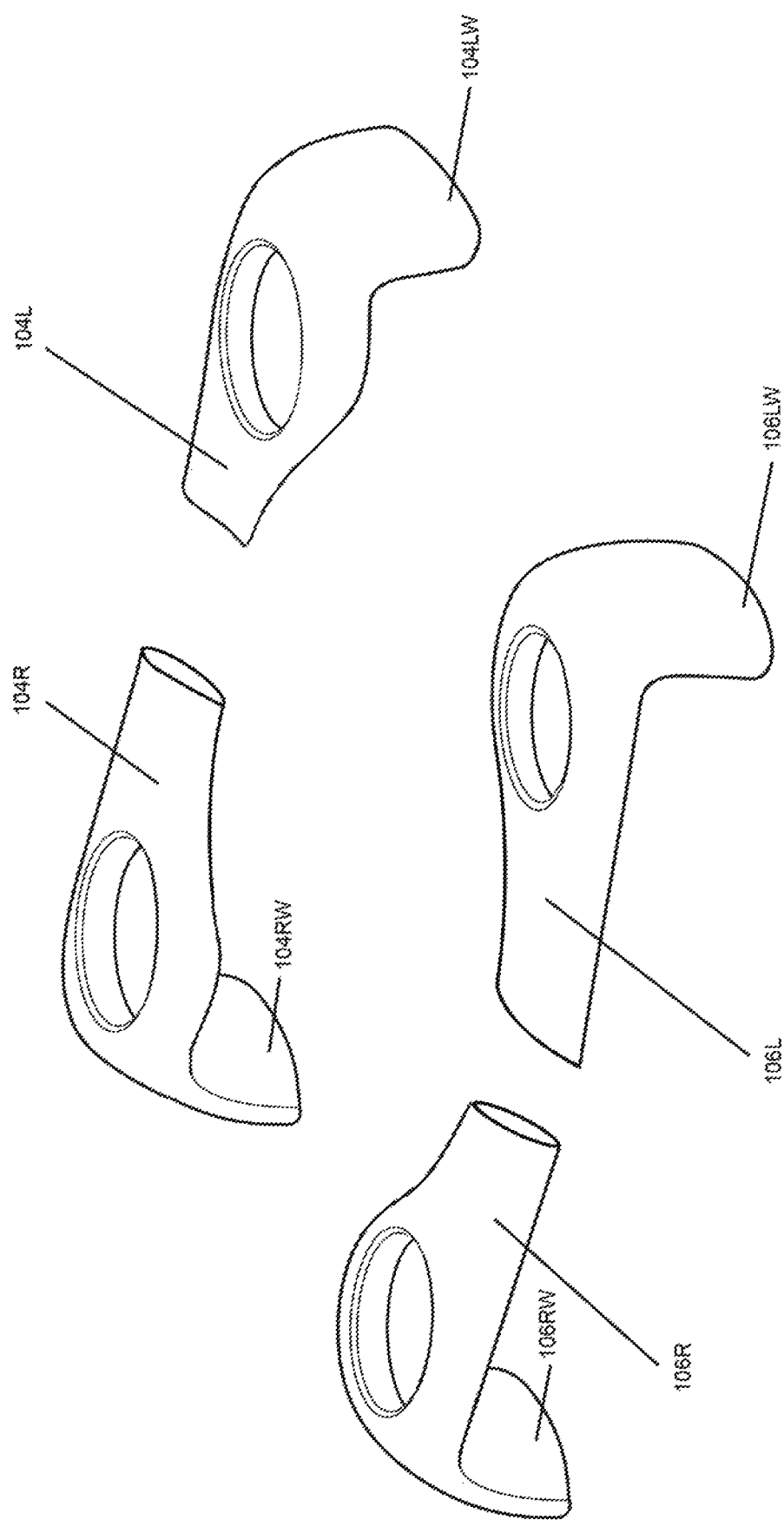
FIG. 9 is a perspective view of the wings with integrated winglets.

The four peripheral rotor assemblies 166, shown further with reference to FIGS. 8 and 9, are mounted in four wings 104R, 104L, 106R and 106L, which may be made of lightweight composite materials, aluminum or other suitable materials, provide directional control. The wings 104R, 104L, 106R and 106L have integrated winglets 106LW, 106RW, 104LW and 104RW that extend vertically down from the wingtips and provide lateral stability, in part by confining the airflow proximate to the integrated winglets. The downward facing winglets focus the thrust of rotatably mounted rotors/fans 114 (described below) during operation. The winglets may contain mounting points for landing gear (not shown). In yet an alternative embodiment, the PAV may include vehicle wheels for use on traditional roadways, and be configured to meet the requirements for driving on such surfaces, including the scale and orientation of the central rotor assembly 164, four peripheral rotor assemblies 166 and fuselage 102.

With reference to FIG. 8, the peripheral rotor assemblies 166 are composed of rotatably mounted rotors/fans 114, out-runner brushless motor 116, motor mount 116B, rotatable shaft 118 and rotatable shroud 122 In a preferred embodiment, the rotor/fan is rotatable in three dimensions and the motor mount is rotatable on a vertical plane actuated by a servomechanism controlled through a flybywire system. Likewise, the shroud is preferably rotatable on a horizontal plane within its wing mount actuated by a servomechanism controlled through a fly by wire system, but may be fixed.

Figure 4:
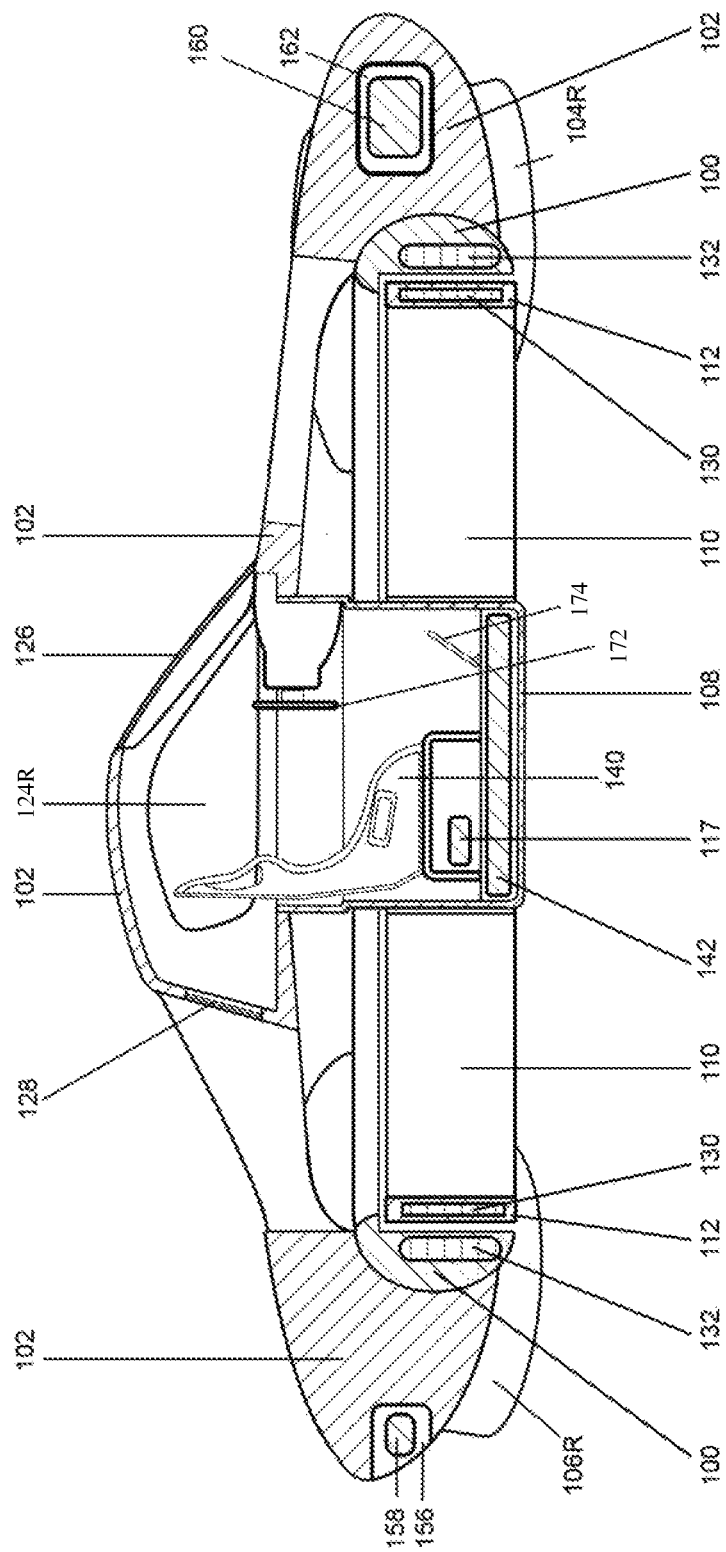
FIG. 4 is a side schematic cross-sectional view of the present invention.

With further reference to FIG. 4, the central rotor assembly 164 is preferably powered by an in-runner style brushless motor integrated into the components of the central rotor assembly, consisting of stator windings 132 within the ducted fan housing 100 and rotor magnets 130 within the central rotor shroud 112. The centralized rotor assembly functions as an in-runner style brushless motor, a rotor creating enough thrust for vertical flight and a gyroscope for stability. The four peripheral rotor assemblies 166 are preferably each powered by four direct drive out-runner style brushless electric motors 116, one located in each wing 104R, 104L, 106R,106L powering each peripheral rotor 114.

Figure 1:
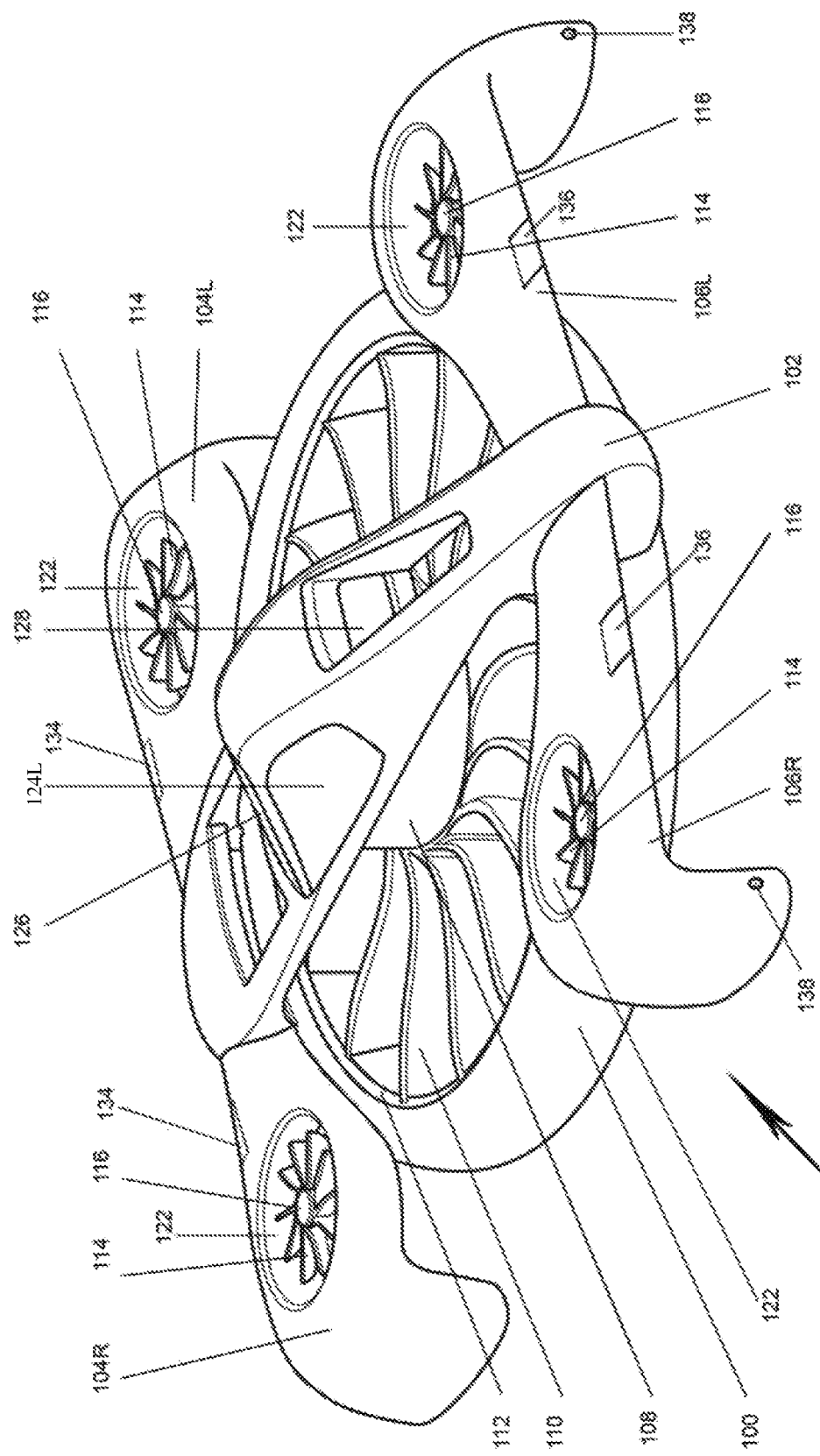
FIG. 1 is a perspective view showing the preferred embodiment of the invention with central cockpit encompassing ducted fan.
Figure 2:
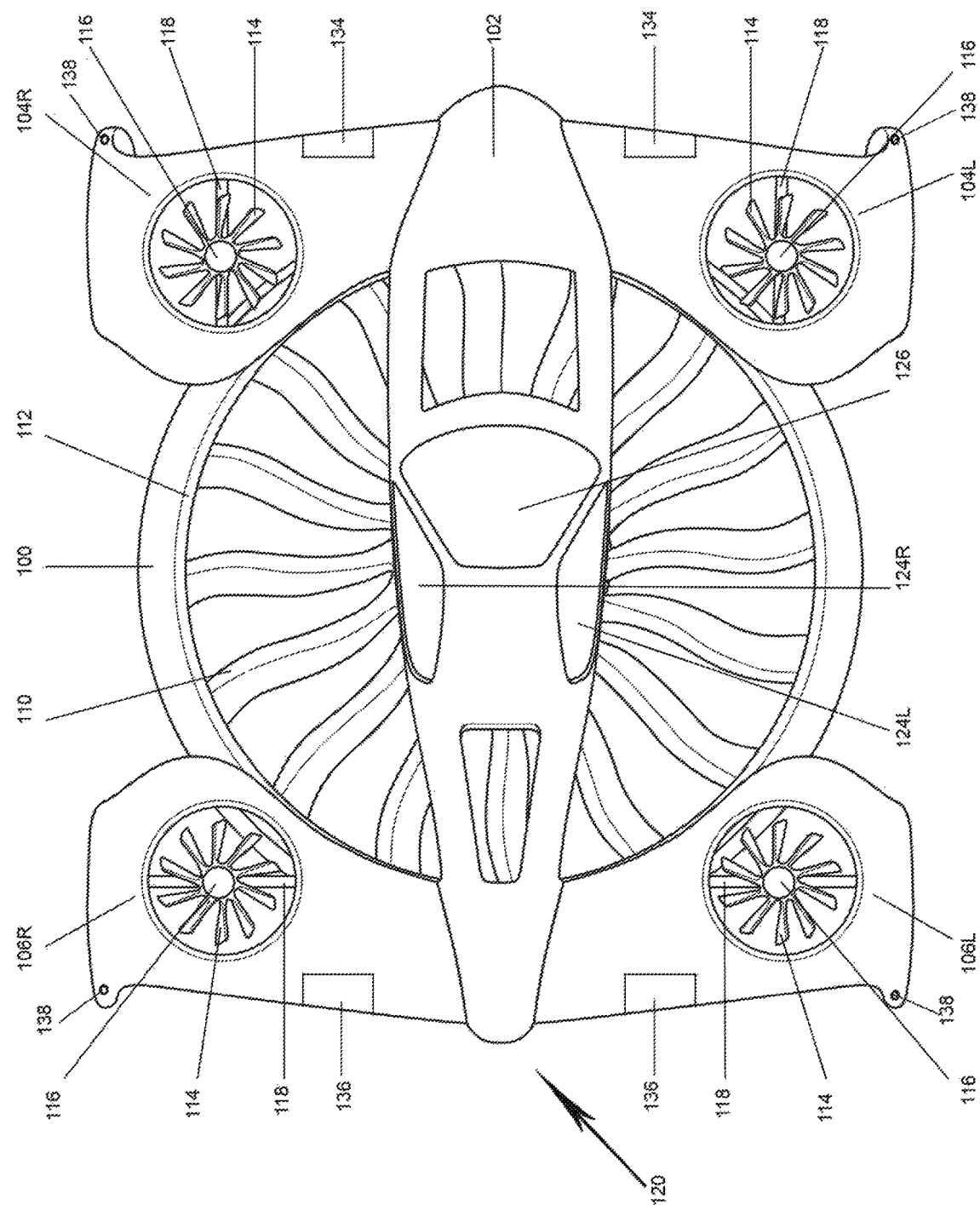
FIG. 2 is a top view of the preferred embodiment of the invention with central cockpit encompassing ducted fan.
Figure 3:
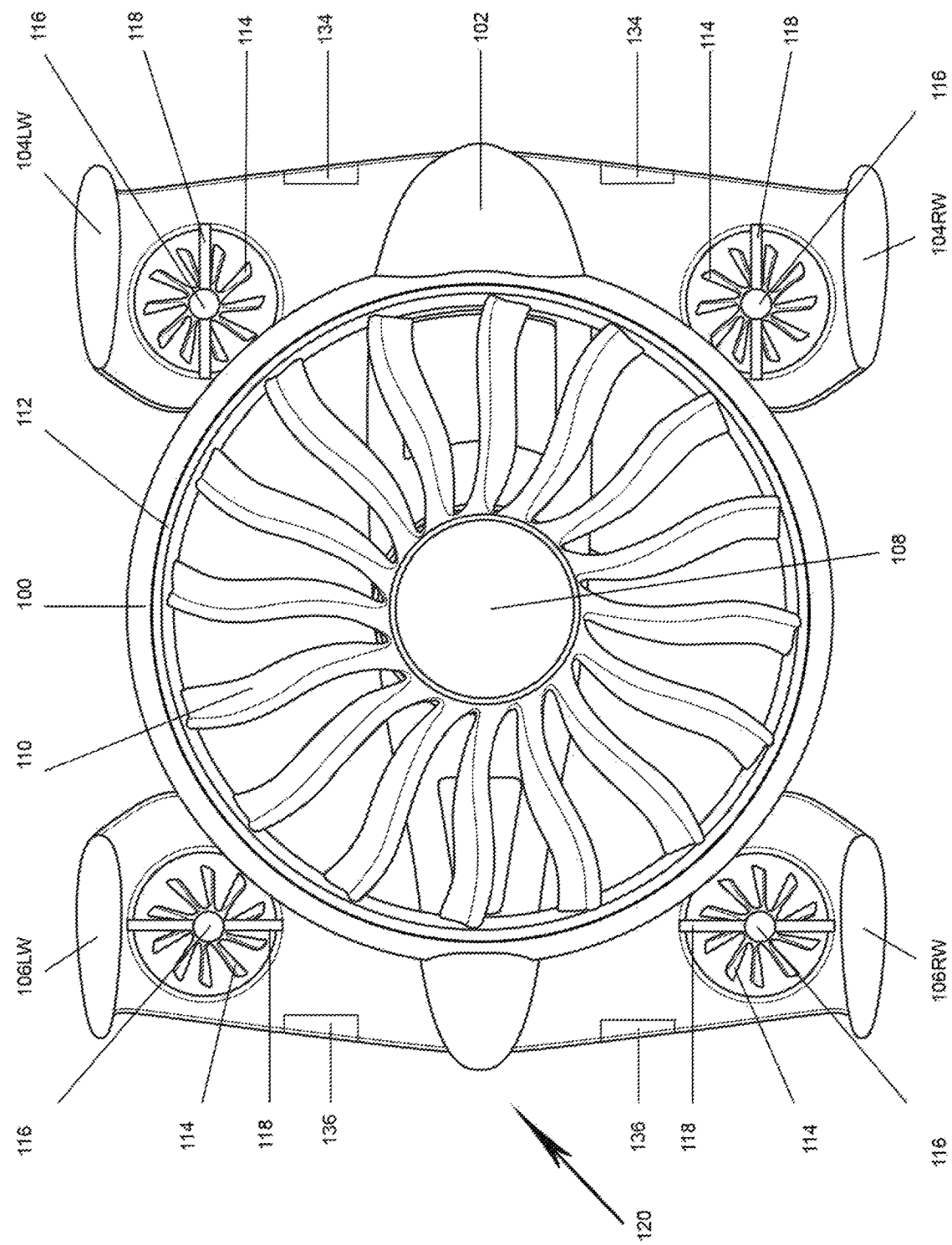
FIG. 3 is a bottom view of the preferred embodiment of the invention with central cockpit encompassing ducted fan flying vehicle.

With reference to FIGS. 1, 2 and 4, the fuselage 102 has a transparent front windshield 126, a transparent rear window 128 and two pivotally hinged gull-wing styled doors 124L and 124R connectably integrated with a cockpit 108. Preferably the fuselage is made of composite, aluminum, or other suitable material with transparent window material encompassing most of the surface to serve as the side windows 124L,124R. The cockpit 108 may have transparent material of oval or other suitable shape located throughout to provide additional viewing angles. The side doors 124L, 124R may pivot wide open to allow for loading/unloading of large loads; e.g., an emergency stretcher or large cargo. Some embodiments of the present invention may have a one-seat cabin, but other embodiments may include fewer or more than two seats, and still other embodiments may be utilized as an unmanned aerial vehicle (UAV) with no seats. In another embodiment the PAV maybe scaled to operate as a small remotely controlled device for a hobbyist or commercially to deliver parcels or used for capturing video or photographic images.

The central cockpit 108, which may be made of lightweight composite materials, aluminum, or other suitable materials, may be mounted proximate to the central rotor assembly 164 and extends through the bottom of the central rotor 110. In a preferred embodiment, as shown with reference to FIGS. 1 and 4, the cockpit is preferably positioned to be substantially surrounded by the central rotor assembly 164 such that at least a portion of the cockpit forms the central hub of the central rotor assembly 164. Inside the cockpit is located the user's seat 140, flight computer 117, vehicle steering 172 such as a wheel or yoke, yaw pedals 174 and batteries 142 for powering the motors 116, central rotor assembly 164, flight computer 117 and all ancillary systems. In an alternate embodiment, the flying vehicle utilizes a fuel cell (not shown) for powering all of the various systems and assemblies in place of batteries 142. In one embodiment, the flight computer 117 is controlled by a fly-by-wire system that calculates gyroscopic stability and sends information to the four wing mounted rotor/fans ducted fans and central ducted fan to adjust them to the correct orientation and rotational speed for controlled level flight or smooth descent. The computer can fly the vehicle autonomously while inputs from the pilot can alter the flight path.

The centralized positioning of the cockpit 108 allows the PAV to maintain a constant center of gravity regardless of the weight of its user and power supply. The bottom of the cockpit 108 may serve as an attachment point for landing gear (not shown) or a safety air bag device in the case of a crash landing (not shown). Alternatively, the forward section of the fuselage 102 may serve as a mounting point for pivoting landing gear to provide a tight turning radius (not shown).

The PAV may optionally include headlights/landing lights encasement 134, including a streamlined transparent protective covering, located on the leading edge of fore wings 104R and 104L. The PAV may optionally include taillights encasement 136, including a streamlined transparent protective covering, located in the aft wings 106R and 106L. Navigation lights 138 are preferably located in the leading edge of the winglets 104RW and 104LW winglets and in the trailing edge of the winglets 106RW and 106LW.

Optionally, an emergency parachute 158 with deployment rocket launcher may be stored in a storage location compartment 156 in the rear of fuselage 102, attachment points integrated into compartment 156.

Avionics 160, including the PAV's gyroscopic equipment, etc. may be located inside compartment 162 in the forward area of the fuselage 102. Such equipment provides for guidance, navigation and control; for example, it may serve as a data bus which takes the night instrumentation, weather and additional data, along with pilot input, to control flight. A second bay may be located in the back (not shown) for redundancy. The flight computer 117 may use the avionics 160 to continuously balance and stabilize the PAV. In alternative embodiments, the PAV may further include proximity detectors working in conjunction with the avionics 160 to monitor the PAV and its surrounding to alter the flight path to avoid any collisions or landings that could damage the PAV. In yet alternative embodiments, the PAV may include an integrated flight training computer that, when activated, takes the pilot through a series of training routines and requiring a predetermined proficiency before allowing the pilot to freely pilot the PAV. Either the flight computer 117, the integrated flight training computer or other computer system may also be used as a controlled flight governor that restricts the altitude and speed of the PAV based on one or more predetermined criteria, for example, based on safety parameters or pending pilot proficiency indicators.

While the preferred embodiment of the invention has been illustrated and described, as noted above, many changes can be made without departing from the spirit and scope of the invention. For example, instead of battery power, the central rotor assembly 164 and/or four peripheral rotor assemblies 166 may be powered by one or more external electric motors, combustion engines or other fuel sources. In an alternative embodiment, the cockpit may be encompassed by stator windings that act upon magnets contained in the inner circumference of the central rotor and function as an electric in-runner motor. If an independent electric motor is connected to the central rotor assembly, the stator windings located in the shroud may be removed. In an embodiment utilizing a combustion engine, the stator windings of the central rotor assembly may also be removed. The weight of the magnets in the rotor shroud 112 may be positioned to create a heightened gyroscopic effect in the spinning rotor, adding stability to the PAV. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A flying vehicle, comprising:
   a central rotor assembly configured to provide vertical thrust for take-off and landing,
      wherein the central rotor assembly comprises
         a plurality of counter rotating rotors with opposing pitch; and
         a plurality of magnetic shrouds integrated with the counter rotating rotors,
      wherein the counter rotating rotors and magnetic shrouds form an integrated mechanical gyroscope;
   a fuselage having a longitudinal axis amounted to the central rotor assembly;
   a plurality of wings extending from the fuselage, each wing having a peripheral rotor assembly mounted thereto providing directional control of the vehicle;
   a cockpit integrated with the fuselage and substantially surrounded by the central rotor assembly such that at least a portion of the cockpit forms a central hub of the central rotor assembly;
   a flight computer, wherein the flight computer detects changes in the central mechanical gyroscopic effect and adjusts the thrust of the plurality of peripheral rotor assemblies to maintain desired orientation; and
   a power source for powering the peripheral rotor assemblies, the central rotor assembly and the flight computer.

2. The flying vehicle of claim 1, wherein the plurality of peripheral rotor assemblies comprise:
   a rotatably mounted rotor;
   an out-runner brushless motor;
   a shaft supporting the rotatably mounted rotor;
   a shroud, wherein the shroud may be fixed or rotatable; and
   a direct drive out-runner style brushless motor for powering the peripheral rotor assembly.

3. The flying vehicle of claim 1, wherein the central rotor assembly comprises:
   a central rotor;
   a central rotor shroud;
   a ducted fan housing partially enclosing the central rotor shroud; and
   an in-runner style brushless motor for powering the central rotor assembly.

4. The flying vehicle of claim 1, wherein the central rotor assembly further comprises:
   a plurality of stator windings configured to rotate the counter rotating rotors in opposition directions; and
   a ducted fan housing partially enclosing the counter rotating rotors.

5. The flying vehicle of claim 1, wherein the fuselage comprises:
   a transparent front windshield;
   a transparent rear window; and
   at least one pivotally hinged door connectably integrated with the cockpit.

6. The flying vehicle of claim 1, wherein the flight computer is located in the cockpit, and the cockpit further comprises a wheel or yoke and yaw pedals.

7. The flying vehicle of claim 1, wherein the flight computer is controlled by a fly-by-wire system that calculates gyroscopic stability and sends information to the plurality of peripheral rotor assemblies to adjust them to the correct orientation and rotational speed for controlled level flight or smooth descent.

8. The flying vehicle of claim 1, wherein the power source is at least one of a battery, fuel cell, electric motor or combustion engine.

9. The flying vehicle of claim 1, further comprising landing gear mounted to at least one of the fuselage and wings.

10. The flying vehicle of claim 1, further comprising an emergency parachute with deployment rocket launcher.

11. The flying vehicle of claim 1, wherein the flight computer uses the avionics to continuously balance and stabilize the flying vehicle.

12. The flying vehicle of claim 11, wherein the flight computer
   determines changes in the integrated mechanical gyroscope effects compared to the vectored thrust created by at least one peripheral rotor assembly; and
   alters the thrust and speed of the gyroscope to maintain stability of the flying vehicle.

13. The flying vehicle of claim 1, further comprising a plurality of proximity detectors working in conjunction with the flight computer to monitor the flying vehicle and its surrounding to alter the flight path to avoid any collisions or landings that could damage the flying vehicle.

14. The flying vehicle of claim 13, wherein the plurality of proximity detectors and the flight computer determines changes to the surrounding atmospheric conditions created by the central rotor assembly of the flying vehicle.

15. The flying vehicle of claim 1, further comprising a flight training computer that, when activated, takes a pilot through a series of training routines and requiring a predetermined proficiency before allowing the pilot to freely pilot the flying vehicle.

16. The flying vehicle of claim 1, wherein the flight computer restricts the altitude and speed of the flying vehicle based on predetermined criteria.

17. The flying vehicle of claim 1, wherein
   the flight computer assesses a pilot's ability to pilot the flying vehicle; and
   the predetermined criteria is a function of the pilot's ability to pilot the flying vehicle.

18. A multi-purpose air and land vehicle, comprising:
   a central rotor assembly configured to provide vertical thrust for take-off and landing, wherein the central rotor assembly includes an integrated mechanical gyroscope having a plurality of magnetic shrouds integrated with a plurality of counter rotating rotors;
   a fuselage having a longitudinal axis mounted to the central rotor assembly;
   a plurality of wings extending from the fuselage, each wing having a peripheral rotor assembly mounted thereto providing directional control of the vehicle in either air or land travel comprising:
      a rotatably mounted rotor;
      an out-runner brushless motor;
      a shaft supporting the rotatably mounted rotor;
      a direct drive out-runner style brushless motor for powering the peripheral rotor assembly; and
      at least one vehicle wheel for use on traditional roadways;
   a cockpit integrated with the fuselage and substantially surrounded by the central rotor assembly such that at least a portion of the cockpit forms a central hub of the central rotor assembly;
   a flight computer; and
   a power source for powering the peripheral rotor assemblies, the central rotor assembly and the flight computer.

19. The multi-purpose air and land vehicle of claim 18, wherein the central rotor assembly comprises:
- a central rotor;
- a central rotor shroud;
- a ducted fan housing partially enclosing the central rotor shroud; and
- an in-runner style brushless motor for powering the central rotor assembly.

20. The multi-purpose air and land vehicle of claim 18, wherein the central rotor assembly comprises:
- a plurality of stator windings configured to rotate the counter rotating rotors in opposition directions; and
- a ducted fan housing partially enclosing the counter rotating rotors.

21. The multi-purpose air and land vehicle of claim 18, wherein the fuselage comprises:
- a transparent front windshield;
- a transparent rear window; and
- at least one pivotally hinged door connectably integrated with the cockpit.

22. The multi-purpose air and land vehicle of claim 18, wherein the flight computer is located in the cockpit, and the cockpit further comprises a wheel or yoke and yaw pedals.

23. The multi-purpose air and land vehicle of claim 18, wherein the flight computer detects changes in the central mechanical gyroscopic effect and adjusts the thrust of the plurality of peripheral rotor assemblies to maintain desired orientation.

\* \* \* \* \*

UNITED STATES PATENT AND TRADEMARK OFFICE
CERTIFICATE OF CORRECTION

PATENT NO. : 10,676,180 B2
APPLICATION NO. : 15/891293
DATED : June 9, 2020
INVENTOR(S) : Jesse Antoine Marcel It is certified that error appears in the above-identified patent and that said Letters Patent is hereby corrected as shown below:

In the Claims

In Column 5, Lines 3-28 should read as follows:
1. A flying vehicle, comprising:
a central rotor assembly configured to provide vertical thrust for take-off and landing, wherein
    the central rotor assembly comprises
        a plurality of counter rotating rotors with opposing pitch; and
        a plurality of magnetic shrouds integrated with the counter rotating rotors, wherein
            the counter rotating rotors and magnetic shrouds form an integrated
            mechanical gyroscope;
a fuselage having a longitudinal axis mounted to the central rotor assembly;
a plurality of wings extending from the fuselage, each wing having a peripheral rotor assembly
    mounted thereto providing directional control of the vehicle;
a cockpit integrated with the fuselage and substantially surrounded by the central rotor assembly
    such that at least a portion of the cockpit forms a central hub of the central rotor assembly;
a flight computer, wherein the flight computer detects changes in the central mechanical
    gyroscopic effect and adjusts the thrust of the plurality of peripheral rotor assemblies to
    maintain desired orientation; and
a power source for powering the peripheral rotor assemblies, the central rotor assembly and the
    flight computer.

Signed and Sealed this
Twenty-first Day of July, 2020

Andrei Iancu
*Director of the United States Patent and Trademark Office*